United States Patent
Marcos Izquierdo (10) Patent No.: US 12,209,652 B2
(45) Date of Patent: Jan. 28, 2025

(54) MECHANICAL PART FOR AN AIRCRAFT TURBOMACHINE AND CORRESPONDING TURBOMACHINE

(71) Applicant: SAFRAN TRANSMISSION SYSTEMS, Colombes (FR)

(72) Inventor: Juan-Luis Marcos Izquierdo, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 17/805,380

(22) Filed: Jun. 3, 2022

(65) Prior Publication Data

US 2022/0390004 A1    Dec. 8, 2022

(30) Foreign Application Priority Data

Jun. 7, 2021 (FR) ...................... 2105971

(51) Int. Cl.
*F16H 57/04* (2010.01)
*F01D 25/18* (2006.01)

(52) U.S. Cl.
CPC ......... *F16H 57/0423* (2013.01); *F01D 25/18* (2013.01); *F05D 2260/98* (2013.01); *F05D 2300/611* (2013.01); *F16H 57/0486* (2013.01)

(58) Field of Classification Search
CPC ........... F05D 2260/98; F05D 2300/611; F16H 57/0486; C09D 5/1681
See application file for complete search history.

(56) References Cited

U.S. PATENT DOCUMENTS

| | | | |
|---|---|---|---|
| 6,777,617 B2 * | 8/2004 | Berglund | G02B 6/4446 174/92 |
| 9,121,307 B2 * | 9/2015 | Aizenberg | A61L 27/50 |
| 10,082,105 B2 * | 9/2018 | McCune | F16H 57/04 |

* cited by examiner

*Primary Examiner* — Derek D Knight
(74) *Attorney, Agent, or Firm* — WOMBLE BOND DICKINSON (US) LLP (57) ABSTRACT

A mechanical part for an aircraft turbomachine, the mechanical part being made of metal and comprising at least one profiled surface configured to ensure an oil flow during operation. According to the invention, the surface includes a more hydrophobic and/or lipophobic coating than the surface or a surface texturing rendering the surface more hydrophobic and/or lipophobic

17 Claims, 5 Drawing Sheets

MECHANICAL PART FOR AN AIRCRAFT TURBOMACHINE AND CORRESPONDING TURBOMACHINE

TECHNICAL FIELD OF THE INVENTION

The present invention relates to the general field of turbomachines and in particular to the aircraft turbomachines. In particular, it is aimed at a turbomachine part intended to ensure an oil flow during operation.

TECHNICAL BACKGROUND

The prior art comprises the documents JP-A-2011 112145, JP-A-2011 185322, US-A1-2020/309032.

An aircraft turbomachine consumes in particular oil to operate. This oil is for example necessary to ensure the lubrication of mechanical parts, such as bearings or gears, and can also be used to cool these parts.

Some mechanical parts of an aircraft turbomachine comprise profiled surfaces to ensure an oil flow during operation. This is the case, for example, with the gutters of recovery of the lubricating oil of mechanical reducer, in particular with gear train.

The purpose of a mechanical reducer is to change the gear and torque ratio between an input shaft and an output shaft of a mechanical system. Generally speaking, the mechanical reducer comprises a sun gear, a ring gear and planet gears that are engaged between the sun gear and the ring gear. The planet gears are maintained by a frame referred to as planet carrier.

There are several reducer architectures. In the prior art of the double-flow turbomachines, the reducers are of the planetary gear train or epicyclic gear train type. In other similar applications, there are architectures referred to as differential or "compound". In a reducer with planetary gear train, the planet carrier is stationary and the ring gear is movable and forms the output shaft of the device which rotates in the opposite direction to the sun gear. In a reducer with epicyclic gear train, the ring gear is stationary and the planet carrier is the output shaft of the device which rotates in the same direction as the sun gear. In a reducer with differential gear train, no element is attached in rotation. The ring gear rotates in the opposite direction of the sun gear and of the planet carrier.

As these reducers are composed of several wheels and/or pinions that mesh with each other, their lubrication is an essential aspect for the proper operation of the reducer and of the turbomachine. Indeed, when the reducer is not sufficiently lubricated, friction between the teeth of the gear wheels and/or pinions or at the level of the bearings leads to their premature wear and thus to a decrease in the efficiency of the reducer. In addition, the gear train of the reducers generates a high thermal power that causes the oil to heat up during operation; the oil absorbs heat energy generated by the reducer. The temperature of the oil has an impact on its viscosity and on its lubrication efficiency. It is therefore important to evacuate the hot oil after lubrication of the reducer, so that it can be recycled. The recycling consists of cooling, filtering and deaerating the oil before it is reinjected into the lubrication system. The recycling also allows to prevent an increase in ventilation losses in the reducer, an increase in the temperature of the internal members of the reducer, an excessive air ratio in the oil, etc.

In order to recover the oil, an annular gutter provided around the external ring gear of the reducer has been proposed. The gutter typically has a U-shaped cross-section. The bottom and the side walls of the gutter have a surface that is oriented towards the periphery of the ring gear and is intended to receive the oil spraying by centrifuging. The oil flows along this surface towards an outlet located at the lower portion of the gutter. Examples of gutters are described in the patent application FR-A1-3081513.

However, since the reducer requires a high oil flow rate for its operation, it is important that this oil flow rate be channelled and evacuated as quickly as possible in order to be cooled and then reinjected into the lubrication system of the reducer.

The invention is intended to avoid the aforementioned disadvantages.

SUMMARY OF THE INVENTION

The objective of the invention is to provide a simple, effective and economical solution allowing to facilitate the flow of a fluid such as the oil on an aircraft turbomachine part.

This is achieved by means of a mechanical part for an aircraft turbomachine, the mechanical part being made of metal and comprising at least one profiled surface configured to ensure an oil flow during operation, said surface comprising a coating that is more hydrophobic and/or lipophobic than said surface or a surface texturing rendering said surface more hydrophobic and/or lipophobic, the part being an annular lubricating oil recovery gutter, in particular for a mechanical reducer.

Thus, this solution allows to achieve the above-mentioned objective. In particular, the surface coating or texturing allows to render hydrophobic and/or lipophobic the flow surface of the oil. This allows to reduce the spreading coefficient of the oil on the surface and thus favours the formation of drops for example rather than the spreading of the oil on the surface which then forms a film. This allows to facilitate the flow of the oil over the surface that does not "cling" to the surface and thus accelerates this flow. The acceleration of the oil on the surface allows to limit the impact of the ventilation air on this oil. It can also allow to accelerate the oil evacuation and its recycling and thus allow to reduce the amount of oil consumed during operation of the turbomachine.

The mechanical part comprises one or more characteristics, taken alone or in combination:
- the surface faces oil ejection means.
- said coating or said texturing extends over only one portion of said profiled surface.
- said coating or said texturing extends over the entirety of said surface.
- the mechanical part extends circumferentially about an axis and has a cross-section shaped like a U, the U-shape comprising two opposing side walls and a bottom wall, the surface being at least one surface of the bottom wall and these walls being configured to ensure an oil flow during operation, at least one portion of the surface comprising a hydrophobic and/or lipophobic coating or a surface texturing rendering said surface hydrophobic and/or lipophobic.
- the hydrophobic coating is made of polymer, in particular a fluopolymer such as a polytetrafluoroethylene.
- the surface texturing comprises a surface repetition of hollow or bump patterns of micrometric or nanometric dimensions, made for example by laser.

The invention also relates to a mechanical reducer for an aircraft turbomachine, the mechanical reducer having a planetary gear train and comprising a sun gear, a ring gear extending around the sun gear, planet gears meshed with the sun gear and the ring gear, and at least one mechanical part, having any of the preceding characteristics, arranged radially around the ring gear so that the surface extends around the ring gear.

The invention also relates to a turbomachine comprising at least one mechanical part of turbomachine as above-mentioned or a mechanical reducer as above-mentioned.

The invention further relates to an aircraft comprising at least one turbomachine as above-mentioned.

BRIEF DESCRIPTION OF FIGURES

The invention will be better understood, and other purposes, details, characteristics and advantages thereof will become clearer upon reading the following detailed explanatory description of embodiments of the invention given as purely illustrative and non-limiting examples, with reference to the appended schematic drawings in which.

DETAILED DESCRIPTION OF THE INVENTION

Figure 1:
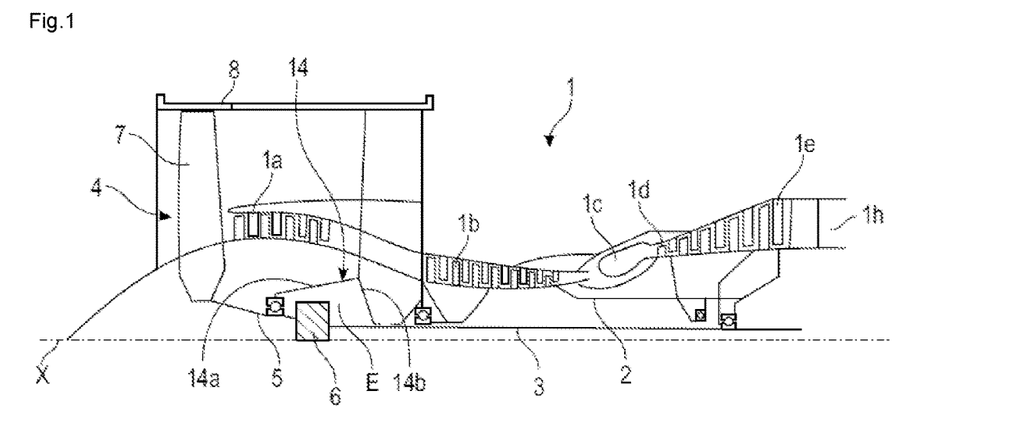
FIG. 1 shows an axial cross-section of a turbomachine using the invention.

FIG. 1 shows a turbomachine that is intended to be mounted on an aircraft. The turbomachine illustrated is a turbofan, but the invention is not limited to this turbomachine. The turbomachine can be a turboprop engine and comprise a single propeller or a doublet of counter-rotating propellers rotating around a longitudinal axis and designated by the expression "open rotor" for unducted propeller or unducted propellers. The turbomachine can also be a turboshaft engine.

Generally speaking, a double-flow turbomachine 1 with a longitudinal axis X comprises, from upstream to downstream and in the direction of flow of the gas flows, a compressor cross-section, a combustion chamber 1c, and a turbine cross-section. The compressor cross-section may comprise a low-pressure compressor 1a and a high-pressure compressor 1b. The turbine cross-section may comprise a low-pressure turbine 1e and a high-pressure turbine 1d. The compressors, the combustion chamber and the turbines form a gas generator. The high-pressure compressor 1b and the high-pressure turbine 1d are connected by a high-pressure shaft 2 and together they form a high-pressure (HP) body. The low-pressure compressor 1a and the low-pressure turbine 1e are connected by a low-pressure shaft 3 and together they form a low-pressure (LP) body.

Downstream of the low-pressure turbine 1e, an exhaust nozzle 1h is arranged to allow the evacuation of the gases resulting from the combustion chamber 1c outward.

A fan 4 is mounted upstream of the low-pressure compressor 1a. The fan 4 is driven by a fan shaft 5 which is driven by the LP shaft 3 by means of a mechanical reducer 6. The fan 4 comprises a plurality of fan vanes 7 that extend radially outward from a fan disc. The fan vanes 7 are radially delimited by a fan casing 8. The latter carries a nacelle attached to the aircraft.

Figure 2:
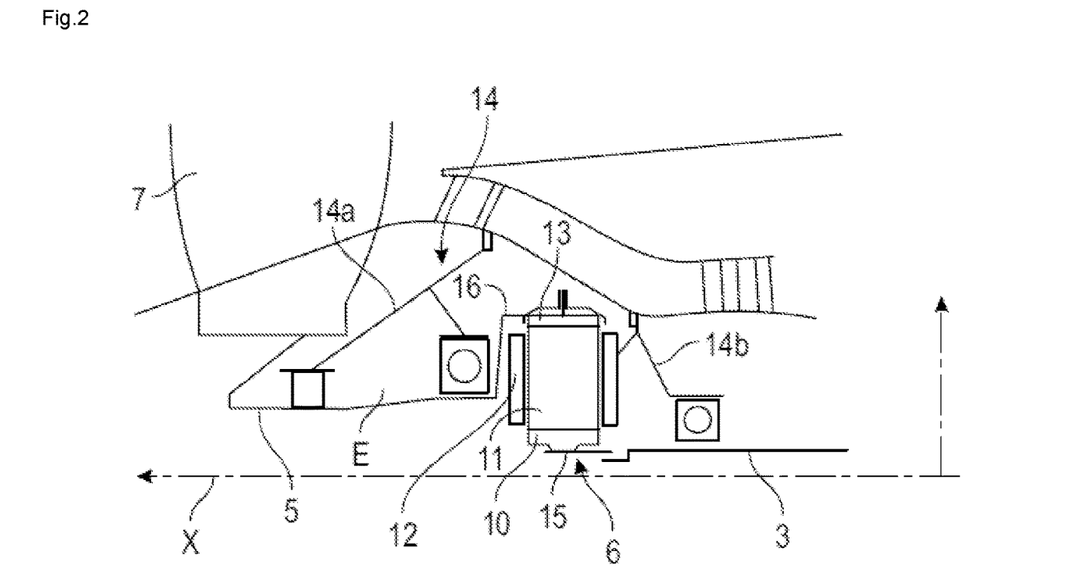
FIG. 2 is a partial schematic view in axial cross-section of a mechanical reducer installed in a turbomachine according to the invention.

The reducer 6 is formed with a gear train and is known by the acronym RGB for "Reduction Gear Box". The reducer 6 is generally of the planetary or epicyclic type. The reducer comprises, as schematically illustrated in FIG. 2, a sun gear 10 (or internal planetary), planet gears 11, a planet carrier 12 and a ring gear 13 (or external planetary). The sun gear 10, the ring gear 13 and the planet carrier 12 are planetary because their axes of revolution coincide with the longitudinal axis X of the turbomachine. The planet gears each have a different axis of revolution and are equally distributed on the same operating diameter around the axis of the planetaries. These axes are parallel to the longitudinal axis X.

In this example, the reducer 6 is here with a planetary gear train. The input of the reducer is coupled to the LP shaft 3 while the output of the reducer is coupled to the fan shaft. In particular, the ring gear 13 is rotatable and the planet carrier 12 is non-rotatable.

Although the following description refers to a reducer with planetary-type gear train, it also applies to an epicyclic gear train or a mechanical differential gear train in which the three components, namely the planet carrier, the ring gear and the sun gear, are rotatable, the rotational speed of one of these components being dependent, in particular, on the difference in speed of the other two components.

The reducer 6 is positioned in the upstream portion of the turbomachine. A stationary structure 14 schematically comprises an upstream portion 14a and a downstream portion 14b, which makes up the motor casing or stator. The stationary structure is arranged to form an enclosure E surrounding the reducer 6. This enclosure E is closed upstream by seals at the level of an upstream bearing allowing the passage of the fan shaft 5, and downstream by seals at the level of the passage of the LP shaft 3. The upstream bearing allows to support and guide the fan shaft 5 in rotation in order to support the radial and axial loads it is subjected to. This upstream bearing is mounted in the enclosure E. Two upstream bearings can be provided to guide the fan shaft 5 in rotation as shown in FIG. 2.

Figure 3:
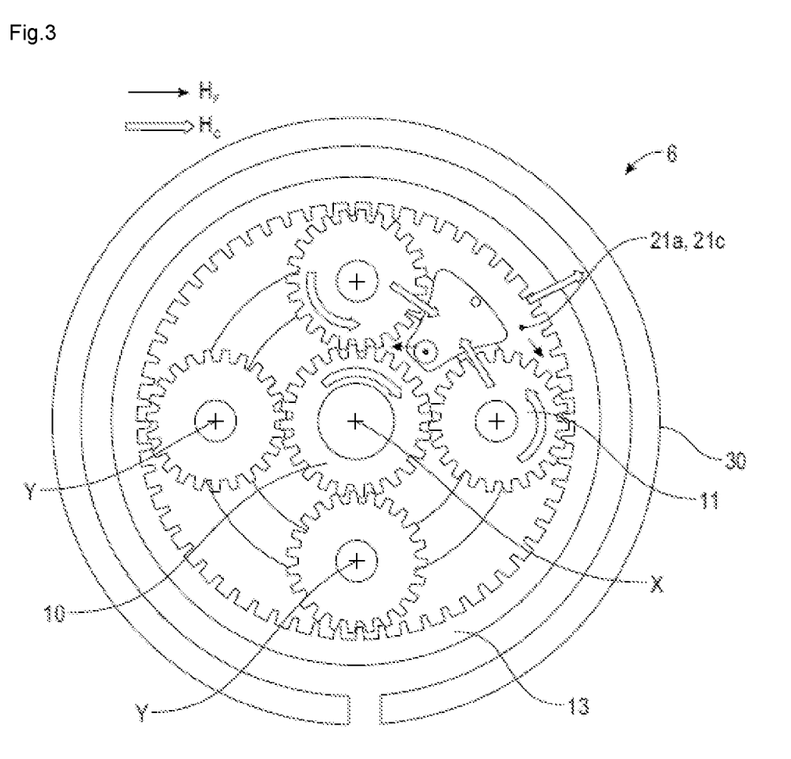
FIG. 3 is a schematic cross-sectional view of an example of a mechanical reducer.

FIGS. 2 and 3 show the reducer 6, which can take the form of different architectures depending on whether certain parts are stationary or rotating. The input of the reducer 6 is connected to the LP shaft 3, for example by means of internal splines 15. Thus, the LP 3 shaft drives the sun gear. Classically, the sun gear 10, whose axis of rotation is coincident with that of the turbomachine X, drives the planet gears 11, which are equally spaced on the same diameter around the axis of rotation X. This diameter is equal to twice the operating centre distance between the sun gear 10 and the planet gears 11. The number of planet gears 11 is generally defined between three and seven for this type of application.

The assembly of the planet gears 11 is maintained by a frame which is the planet carrier 12. Each planet gear 11, in the form of pinion, rotates around its own axis Y, and meshes with the ring gear 13. At the output, the assembly of the planet gears 11 is maintained by the planet carrier 10 which is attached to the motor casing or stator 14. Each planet gear drives the ring gear 13 which is fitted to the fan shaft 4. A ring gear carrier 16 is provided to connect the fan shaft 10 to the ring gear 13. The planet gears 11 are mounted freely rotatably by means of bearings, for example of the roller or hydrostatic bearing type. Each bearing is mounted on one of the axles of the planet carrier and all the axles are positioned relative to each other using one or more structural frame of the planet carrier.

Figure 4:
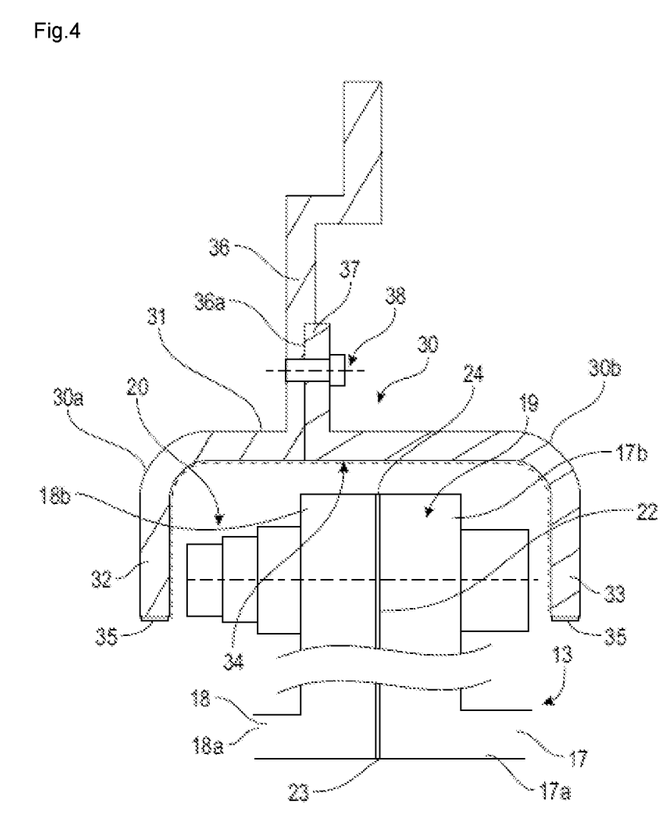
FIG. 4 is a schematic and partial view of a mechanical part of a turbomachine such as a gutter according to the invention.

In FIG. 4, the ring gear 13 is provided with an internal toothing that meshes with the toothing of the planet gears. In the present example of embodiment, the ring gear 13 is formed in two portions (i.e. two half-ring gears). A downstream half-ring gear 17 consists of a rim 17a and an attachment half-flange 17b. The flange 17b extends radially outward. An upstream half-ring gear 18 consists of a rim 18a and an attachment half-flange 18b. The flange 18b extends radially outward. The rim 17a comprises an upstream toothing segment in the form of an upstream propeller of the toothing of the reducer. This upstream propeller meshes with that of the planet gear 11 which meshes with that of the sun gear 10. The rim 18a comprises a downstream toothing segment also in the form of a downstream propeller of the toothing of the reducer. This downstream propeller meshes with that of the planet gear 11 which meshes with that of the sun gear 10. Such a configuration allows to make it even easier to manufacture the ring gear and to facilitate the recovery of the oil. If the propeller widths vary between the sun gear 10, the planet gears 11 and the ring gear 13 because of the toothings overlaps, they are all centred on a median plane for the upstream propellers and on another median plane for the downstream propellers.

The attachment half-flange 17b of the downstream half-ring gear and the attachment half-flange 18b of the upstream half-ring gear form the attachment flange 19 of the ring gear. The ring gear 13 is attached to the ring gear carrier by assembling the attachment flange 19 of the ring gear and an attachment flange of the ring gear carrier. This attachment is made by means of attachment members 20 such as screws, bolts and/or nuts.

During operation, the oil is supplied to the reducer 6 from the stator portion 14 via a dispenser (not shown) by various means which are specific to one or more types of architecture. The dispenser is separated into two portions, each repeated with the same number of planet gears. The dispenser comprises injectors 21a (see FIG. 3) whose function is to lubricate the toothings of the wheels and/or pinions of the reducer and arms whose function is to lubricate the bearings of the reducer. The oil is fed towards the injectors 21a to emerge from ends in order to lubricate with oil referred to as cold oil (HF) the toothings of the planet gears 11, of the sun gear 10 and also of the ring gear 13. The oil is also fed towards the arm and circulates through the feed opening of the bearing. The oil then flows through the shaft into one or more buffer areas and then emerge through the orifices to lubricate the bearings of the planet gears.

With reference to FIG. 3, due to centrifugal forces, oil referred to as hot oil HC for lubricating the toothings is sprayed radially outward in relation to the axles Y of the planet gears. The hot oil is also sprayed and ejected by centrifugal effect from the ring gear 13. In particular, the oil is ejected radially outward at the level of the attachment flange 19 via oil ejection means. The ejection means here comprise one or more channels that are regularly formed between the two half-ring gears and over the entire circumference of the ring gear 13.

Advantageously, but not restrictively, first channels 22 extend substantially along the radial axis Z. Each first channel 22 extends radially between an inlet orifice 23 defined in an internal surface of the ring gear (and which comprises the toothing) and an outlet orifice 24 defined on the periphery of the attachment flange 19. Preferably, but not restrictively, there are a plurality of outlet orifices 24 circumferentially distributed around the periphery of the flange 19. The oil flows from the inside of the ring gear 13 to the outside of the latter via the channel or the channels 22. Second channels may also allow to evacuate the oil flowing around the external periphery of the ring gear towards the first channels 22.

With reference to FIG. 4, the turbomachine is also equipped with an oil recovery device which is provided for recovering and rapidly evacuating the oil ejected by centrifugal effect from the reducer 6 and also from the enclosure E. The recovery device comprises an annular oil recovery gutter 30, which is intended to recover the oil ejected from the reducer 6. The gutter 30, centred on the longitudinal axis X, is arranged around the ring gear 13. The gutter 30 is attached to a stationary structure of the turbomachine (stator). Advantageously, the gutter 30 is attached to the enclosure E surrounding the reducer. The gutter 30 has a generally U-shaped axial cross-section. More specifically, the gutter 30 comprises a bottom wall 31 from which a first side wall 32 and a second side wall 33 extend. The bottom wall 31 and the side walls 32, 33 are annular and centred on the longitudinal axis X. The side walls 32, 33 extend substantially radially (perpendicular to the longitudinal axis X).

The bottom wall 31 is arranged radially outside the ring gear 13 and is oriented facing the oil ejection means. The side walls 32, 33 (referred to as first and second walls) are arranged on either side of the attachment flange 19 along the longitudinal axis. As can be seen in FIG. 4, the gutter 30 comprises a profiled surface 34, here internal, which faces the reducer 6 and the ring gear 13. Each side wall 32, 33 comprises a peripheral edge 35 defining an internal diameter of the gutter that is smaller than the external diameter of the ring gear 13 defined by the periphery of the attachment flange 19. Also the axis of the attachment members 20 of the attachment flange 19 delimits a diameter that is larger than the internal diameter of the peripheral edges 35. This configuration allows to avoid the phenomenon of air being sucked from outside the gutter into the gutter. To enhance this advantage, the bottom wall 31 and the side walls 32, 33 are arranged at a predetermined distance from the attachment flange 19, in particular its periphery and attachment members 19. These predetermined distances take into account the axial displacements of the ring gear during operation of the reducer, manufacturing tolerances and thermal expansion of the parts.

In the example shown, the gutter 30 is formed in two portions to facilitate its assembly and its disassembly in the turbomachine. Of course, the gutter can be formed in one part (integral with). The gutter 30 comprises a first portion 30a and a second portion 30b. The first portion 30a comprises a first tab 36, the first side wall 32 and a bottom wall segment connecting the first tab 36 and the first side wall 32. The second portion 30b comprises a second tab 37, the second side wall 33 and a bottom wall segment connecting the second tab 37 and the second side wall 33. The first and second tabs 36, 37 extend radially outward. In particular, the first and second tabs 36, 37 each comprise a bearing surface defined in a plane, and these planes are parallel. The first portion and the second portion are attached together at the level of the first and second tabs. The tabs 36, 37 are attached to each other by means of attachment members 38. The attachment members 38 comprise screws, nuts, bolts or other suitable member. In this example of embodiment, the first tab 35 comprises an annular recess 36a intended to receive a portion of the second tab 37. The internal surface of the bottom wall and side walls segments have a surface continuity and are flush. The first tab 36, which is longer than the second tab 37, allows the attachment of the gutter 30 to the stationary structure of the turbomachine.

In another alternative, the gutter 30 comprises a single radial tab allowing the attachment to the stationary structure of the turbomachine.

The gutter 30 is made of a metal material. The metal material can be steel or titanium. Advantageously, but not restrictively, the gutter 30 is made from a sheet-metal to lighten its weight. The walls 31, 32, 33 are obtained by folding or welding. The bending and the welding are quick and easy to implement and require very little equipment to manufacture the gutter.

Figure 5:
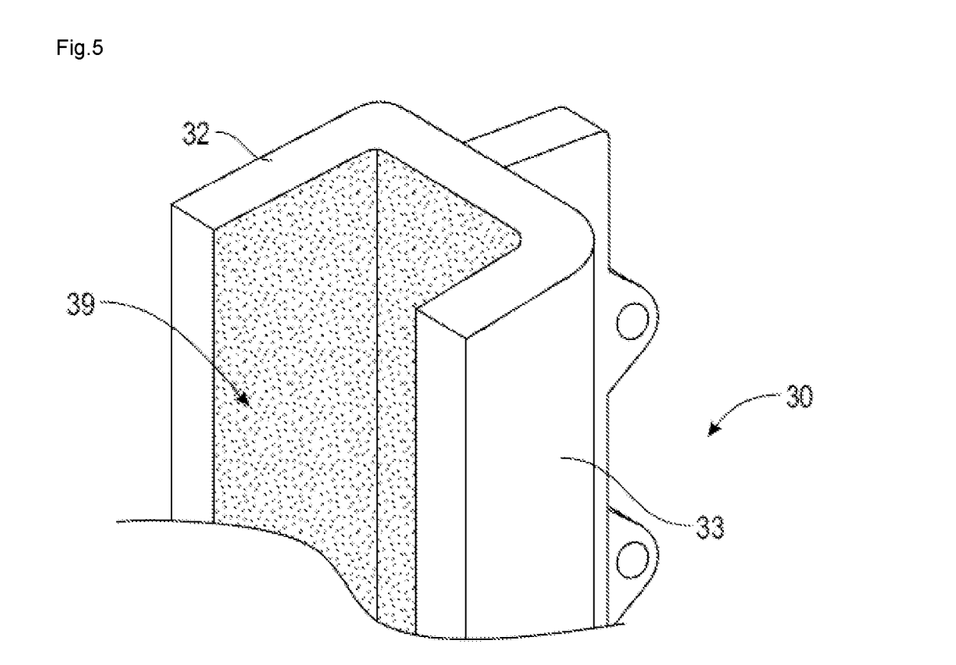
FIG. 5 is a schematic, perspective and partial view of an example embodiment of a turbomachine mechanical part with a hydrophobic and/or lipophobic surface according to the invention.

FIG. 5 shows a first embodiment of a gutter 30 in which the profiled, internal surface 34 comprises a hydrophobic and/or lipophobic coating or a surface texturing rendering said surface hydrophobic and/or lipophobic. As used in this description, the terms "hydrophobic" and "lipophobic" (and even "oleophobic") are used to refer to the ability of a surface to repel water and/or oil from said surface to decrease the contact surface area between the surface and the drop that is formed. Such properties allow to decrease the friction coefficient. The coating or the textured surface allows a smaller coefficient of friction between the surface of the water and/or the oil and the metal surface with the coating. More precisely, the lipophobic and/or hydrophobic character allows the fluid (water/oil/grease) to bead up (pearl shaped) when it is sprayed on the mechanical part, which contributes to a good evacuation of this fluid. Similarly, we also understand by "more lipophobic/hydrophobic" that the surface is less lipophilic/hydrophilic, i.e. the fluid will be less likely to spread/stay on the surface.

The coating or the texturing extends over the entire internal surface of the side walls and of the bottom wall.

Figure 6:
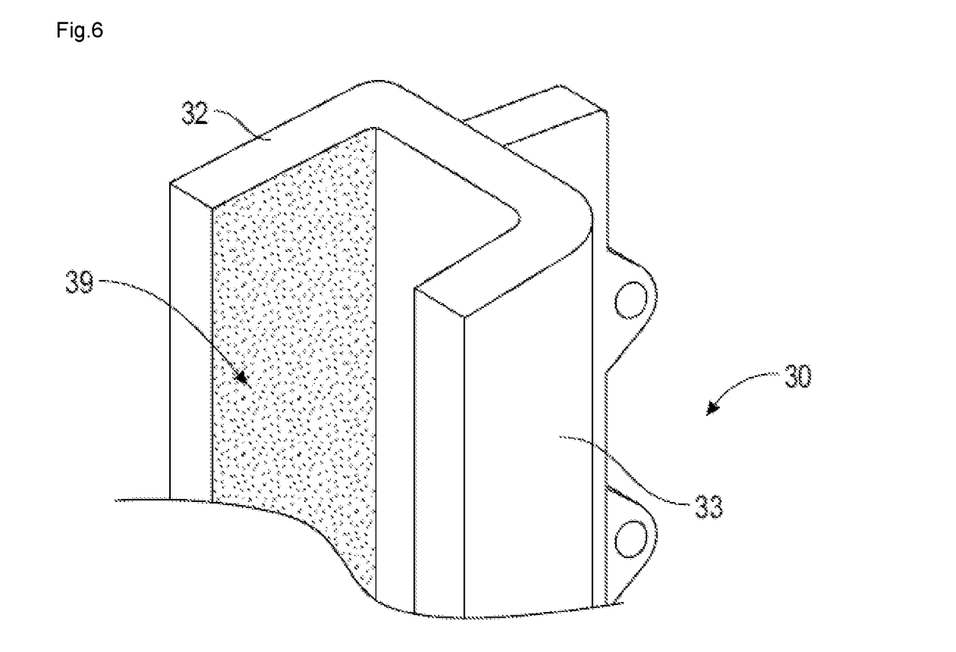
FIG. 6 is a schematic, perspective and partial view of another example of embodiment of a turbomachine mechanical part with a hydrophobic and/or lipophobic surface according to the invention.

FIG. 6 shows a second embodiment of the gutter 30 in which only the surface of the side walls 32, 33 comprises a surface coating or texturing. In other words, the surface of the bottom wall is devoid of any coating or texturing.

According to an alternative not shown, the surface coating or texturing thus extends over predetermined areas of the side walls 32, 33 and/or of the bottom wall 31. The predetermined areas may correspond to annular strips facing the attachment members 38 and/or of the attachment flange 19. In the case of annular areas provided on the side walls, these would be away from the peripheral edges 34 of side walls 32, 33. In the case of the area of the bottom wall, this would be away from the side walls.

Figure 7:
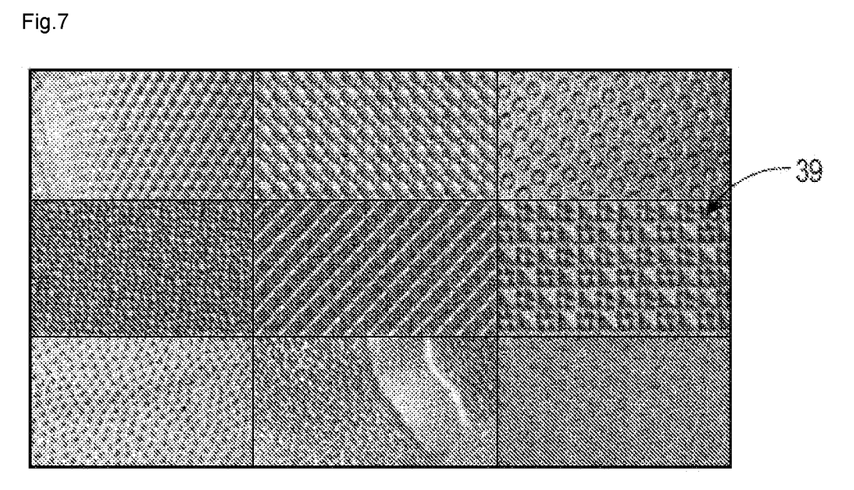
FIG. 7 is a very schematic view of examples of surface texturing for a mechanical part according to the invention.

FIG. 7 shows different examples of surface texturing 39 for the entire surface or certain areas of the surface.

The surface texturing 39 preferably comprises a surface repetition of hollow or bump patterns of micrometric dimensions. The dimensions can also be in the nanometric range. The patterns can be linear or punctual. The texturing 38 is advantageously, but not restrictively, made using a material removal micromachining method. An example of a micromachining method is the laser micromachining.

The hollow or bump patterns allow to decrease the surface area of the surface in contact with the fluid containing water and/or oil and thus reduce the friction of the water and/or oil with the surface. In this way, the patterns have the effect of repelling the fluid that flows or displaces faster over the coating or the textured surface.

Figure 8:
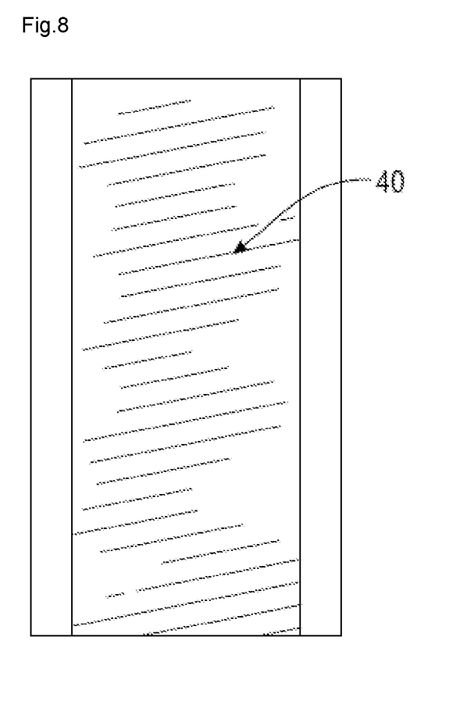
FIG. 8 is a very schematic cross-sectional view of a turbomachine mechanical part, surfaces of which comprise hydrophobic and/or lipophobic coatings according to the invention.

FIG. 8 shows an example of hydrophobic/lipophobic coating 40 intended to coat the internal surface of the side walls and/or the bottom wall or certain predetermined areas thereof.

The hydrophobic and/or lipophobic coating 40 is preferably made of a polymer, and in particular a fluopolymer such as polytetrafluoroethylene (PTFE). It has for example a thickness between 1 and 100 μm. It can be obtained by spraying a solution on the internal surface of each surface and heating to polymerize and harden the coating.

Thus, the mechanical part, here the oil recovery gutter 30, equipped with such a coating 40 or such a texturing 39 facilitates the recovery and the evacuation of the oil. The flow is facilitated by the fact that by decreasing the spreading coefficient of the oil, we increase the speed and thus the evacuation flow rate of the gutter. This evacuation is important in particular in the operating or flight phases of the aircraft where the reducer needs a large flow rate of oil, such as during take-off.

The hydrophobic and/or lipophobic coating and the texturing provide the same advantages mentioned above. The advantage of the texturing over the coating is that it does not introduce any pollutants because the coating is likely to degrade during operation and release unwanted elements into the engine.

The invention claimed is:

1. A mechanical part for an aircraft turbomachine, the mechanical part being made of metal and comprising at least one original surface configured to ensure an oil flow during operation, wherein said original surface comprises a coating onto said original surface that causes said original surface to be more hydrophobic and/or lipophobic than said original surface without coating, the part being an annular lubricating oil recovery gutter for a mechanical reducer, wherein the gutter has an internal profiled surface with side walls, and said gutter faces a reducer and a ring gear, and each said side wall has a peripheral edge defining an internal diameter of the gutter that is smaller than an external diameter of the ring gear defined by the periphery of an attachment flange and an axis of attachment members of the attachment flange delimits a diameter that is larger than the internal diameter of the peripheral edges to avoid air being sucked from outside the gutter into the gutter.

2. The mechanical part according to claim 1, wherein the surface faces oil ejection means.

3. The mechanical part according to claim 1 wherein said coating or said texturing extends over only one portion of said original surface.

4. The mechanical part according to claim 1, wherein said coating or said texturing extends over the entirety of said original surface.

5. The mechanical part according to claim 1, wherein the mechanical part extends circumferentially about an axis and has a cross-section shaped like a U, the U-shape comprising two opposing side walls and a bottom wall, the original surface being at least one surface of the bottom wall and these walls being configured to ensure said oil flow, at least one portion of the original surface comprising said hydrophobic and/or lipophobic coating or said surface texturing rendering said surface hydrophobic and/or lipophobic.

6. The mechanical part according to claim 1, wherein the hydrophobic coating is made of polymer.

7. The mechanical part according to claim 1, wherein the surface texturing comprises a surface repetition of hollow or bump patterns of micrometric or nanometric dimensions.

8. A mechanical reducer for an aircraft turbomachine, the mechanical reducer having a planetary gear train and comprising a sun gear, a ring gear extending around the sun gear, planet gears meshed with the sun gear and the ring gear, and the mechanical part according to claim 1 forming a gutter and being arranged radially around the ring gear so that the surface extends around the ring gear.

9. A turbomachine for an aircraft, comprising at least one mechanical part according to claim 1.

10. A turbomachine for an aircraft, comprising a mechanical reducer having a planetary gear train and a sun gear, a ring gear extending around the sun gear, planet gears meshed with the sun gear and the ring gear, and a mechanical part forming a gutter and being arranged radially around the ring gear so that an original surface extends around the ring gear, said original surface is configured to ensure an oil flow during operation and comprises:
   either a coating that is more hydrophobic and/or lipophobic than said original surface, said coating covers said original surface that is not roughened before coating,
   or a surface texturing rendering said original surface more hydrophobic and/or lipophobic, said surface texturing is performed on said original surface that is curved and not roughened before texturing,
   wherein the gutter has an internal profiled surface with side walls, and said gutter faces a reducer and a ring gear, and each said side wall has a peripheral edge defining an internal diameter of the gutter that is smaller than an external diameter of the ring gear defined by the periphery of an attachment flange and an axis of attachment members of the attachment flange delimits a diameter that is larger than the internal diameter of the peripheral edges to avoid air being sucked from outside the gutter into the gutter.

11. The mechanical part according to claim 1, wherein the surface texturing is made by laser.

12. The mechanical part according to claim 6, wherein the fluopolymer is a polytetrafluoroethylene.

13. The mechanical part according to claim 1, wherein the coating has a thickness between 1 and 100 μm.

14. The mechanical part according to claim 1, wherein the said original surface is flat and solid, said coating covering said original surface.

15. The mechanical part according to claim 1, wherein said surface texturing is free of a liquid or coating.

16. The mechanical part according to claim 6, wherein the polymer is a fluopolymer.

17. The mechanical part according to claim 16, wherein the fluopolymer is polytetrafluroethylene.

* * * * *